(12) United States Patent
Son et al.

(10) Patent No.: US 8,060,096 B2
(45) Date of Patent: Nov. 15, 2011

(54) METHOD AND SYSTEM FOR TRANSMITTING AND RECEIVING A SIGNAL IN A WIRELESS COMMUNICATION SYSTEM

(75) Inventors: Jung-Je Son, Seongnam-si (KR); Nam-Gi Kim, Suwon-si (KR); Min-Hee Cho, Suwon-si (KR); Hyun-Jeong Kang, Seoul (KR); Jae-Hyuk Jang, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1002 days.

(21) Appl. No.: 12/002,174

(22) Filed: Dec. 14, 2007

(65) Prior Publication Data

US 2008/0146236 A1  Jun. 19, 2008

(30) Foreign Application Priority Data

Dec. 15, 2006 (KR) .................. 10-2006-0128727

(51) Int. Cl.
*H04Q 7/20* (2006.01)

(52) U.S. Cl. ........ 455/437; 455/438; 455/439; 455/440; 455/441; 370/474

(58) Field of Classification Search .................. 455/437; 370/474

See application file for complete search history.

(56) References Cited

U.S. PATENT DOCUMENTS

| 5,805,588 | A | 9/1998 | Petersen | |
|---|---|---|---|---|
| 6,301,479 | B1 * | 10/2001 | Roobol et al. | 455/436 |
| 2006/0120404 | A1 | 6/2006 | Sebire et al. | |
| 2007/0010262 | A1 * | 1/2007 | Kang et al. | 455/458 |
| 2007/0253447 | A1 * | 11/2007 | Jiang | 370/474 |

FOREIGN PATENT DOCUMENTS

| JP | 06077983 A | 3/1994 |
|---|---|---|
| KR | 1020000020465 A | 4/2000 |

* cited by examiner

*Primary Examiner* — Charles Shedrick

(57) ABSTRACT

A method and system for transmitting/receiving a signal in a wireless communication system are provided, in which an mobile station determines a sequence number of a first protocol data unit being a last received protocol data unit, transmits the SN of the first protocol data unit to a serving base station, and allocates a virtual SDU sequence number to a service data unit including a second protocol data unit following the first protocol data unit.

30 Claims, 6 Drawing Sheets

METHOD AND SYSTEM FOR TRANSMITTING AND RECEIVING A SIGNAL IN A WIRELESS COMMUNICATION SYSTEM

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Dec. 15, 2006 and assigned Serial No. 2006-128727, the entire disclosure of which is hereby incorporated by reference.

TECHNICAL FIELD OF THE INVENTION

The present invention generally relates to a wireless communication system. More particularly, the present invention relates to a method and system for transmitting and receiving handover-associated signals in a wireless communication system.

BACKGROUND OF THE INVENTION

Handover is a significant study issue in a wireless communication system. In general, when a mobile station (MS) decides to perform a handover, it transmits a handover request message to a base station (BS) and the base station replies with a handover response message. Upon receipt of the handover response message, the mobile station finally selects a target base station and transmits a handover indication message to the target base station, notifying of the handover. In this manner, the mobile station performs the handover.

A handover procedure in a broadband wireless access (BWA) communication system, for example, will be described with reference to FIG. 1.

FIG. 1 is a diagram illustrating a signal flow for a handover procedure in a conventional BWA communication system.

Referring to FIG. 1, a mobile station (MS) 100 receives a Mobile Neighbor Advertisement (MO_NBR-ADV) message from a serving base station (BS) 120 in step 101 and scans the serving BS 120 and first and second neighbor base stations 140 and 160 by measuring their signal strengths in step 103. After the scanning, the MS 100 transmits a Mobile Mobile Station Handover Request (MOB_MSHO-REQ) message to the serving BS 120 in step 105.

The serving BS 120 transmits Handover notification (HO_notification) messages to the first and second neighbor base stations 140 and 160, notifying that the MS 100 may perform a handover to them in steps 107 and 109. The HO_notification messages include information about the service level of an on-going service for the MS 100.

The first and second neighbor base stations 140 and 160 transmit a response message for the HO_notification messages to the serving. BS 120 in steps 111 and 113. The response messages include information about service levels supported by the neighbor base stations 140 and 160.

In step 115, the serving BS 120 transmits a Mobile Base Station Handover Response (MOB_BSHO-RSP) message including the information about the service levels supported by the neighbor base stations 140 and 160 to the MS 100.

The MS 100 transmits a Mobile Handover Indication (MOB_HO-IND) message to the serving BS 120, notifying that it will perform a handover to the second neighbor BS 160 in step 117. The MS 100 decides on the target base station to which it will perform the handover, taking into account the service levels supported by the neighbor base stations.

The serving BS 120 transmits a Handover confirm (HO_confirm) message indicating the handover of the MS 100 to the second neighbor BS 160 in step 119.

Meanwhile, when the mobile station transmits the MOB_HO-IND message to the serving base station, the serving base station takes time to process the MON_HO-IND message. Even during the processing time, the serving base station transmits a control signal or data to the mobile station.

FIG. 2 illustrates a time delay involved in processing the MOB_HO-IND message in the conventional BWA communication system.

Referring to FIG. 2, a serving BS Modulator-Demodulator (MODEM) 220 receives a Bandwidth Request (BR) code for transmission of the MOB_HO-IND message from a mobile station (MS) 200 in frame n in step 201. The serving BS MODEM 220 processes the BR code and allocates resources for the transmission of the MOB_HO-IND message in frame n+4 in step 203.

The MS 200 transmits the MOB_HO-IND message including information about a target BS 260 to the serving BS MODEM 220 using the allocated resources in step 205.

In step 209, the serving BS MODEM 220 transmits the MOB_HO-IND message to a BS 240 after processing the MOB_HO-IND message. The BS 240 includes a signal processor.

Meanwhile, the MS 200 performs a handover to the target BS 260 after transmitting the MOB_HO-IND message to the serving BS MODEM 220 in step 207.

The serving BS 240 transmits an HO-confirm message to the target BS 260 in step 211.

As described above, a time delay occurs from the time when the MS 200 decodes on the handover and transmits the BR code for transmission of the MOB_HO-IND message to the time when the serving BS MODEM 220 discontinues data transmission.

From the perspective of the mobile station, the mobile station may fail to receive data from the serving base station wholly or partially during the time between the decision on the handover and the transmission of the MOB_HO-IND message.

From the perspective of the serving BS, the serving BS has no idea whether the MS has received data successfully or not during the time between reception of the MOB_HO-IND message and interpretation of the MOB_HO-IND message. Therefore, the serving BS transmits information about data next to data that is considered to have normally been received at the MS to the target BS so that the target BS transmits data to the MS based on the received data information.

To prevent this unnecessary resource consumption and time delay, the MS can notify the target BS of the sequence number (SN) of the last service data unit (SDU) or Automatic Repeat reQuest (ARQ) block successfully received from the serving BS by an SN report header, after network reentry to the target BS.

The target BS transmits an SDU or ARQ block with the SN following the SDU SN included in the SN report header to the MS. Table 1 below illustrates the format of the SN report header.

TABLE 1

| HT = 1(1) | EC = 0(1) | Type(3) = 0b110 | Last(1) | SDU SN1(6) | SDU SN2 MSB(4) |
|---|---|---|---|---|---|
| SDU SN2 LSB(2) | | SDU SN3(6) | | CID MSB(8) | |
| | CID LSB(8) | | | HCS(8) | |

In Table 1, numerals in the brackets denote the number of bits in the respective items. SDU SN1 to SDU SN3 are fields indicating the SDU SNs of three connections, when up to three connections are established between the MS and the BS.

The issue is that the current BWA communication system does not label a Medium Access Control (MAC) SDU with an SN. In other words, there is no specified method for indicating an SN of the MAC SDU by an SN report header between the BS and the MS.

The MS may transmit an SN report header including the SN of an ARQ block to the target BS, but the target BS can start data transmission successfully only when the target BS uses the same ARQ scheme and associated variables as used between the MS and the serving BS. Accordingly, there exists a need for a method for allocating an SN to an SDU so that the MS can efficiently start a data transmission/reception procedure with the target BS.

SUMMARY OF THE INVENTION

To address the above-discussed deficiencies of the prior art, it is a primary object of the present invention to address at least the problems and/or disadvantages and to provide at least the advantages described below. Accordingly, an aspect of exemplary embodiments of the present invention is to provide a method and system for starting a data transmission and reception procedure efficiently after a handover of a mobile station in a wireless communication system.

In accordance with an aspect of exemplary embodiments of the present invention, there is provided a method for receiving a signal in a mobile station in a wireless communication system, in which a sequence number (SN) of a first protocol data unit being a last received protocol data unit is determined, the sequence number of the first protocol data unit is transmitted to a serving base station, and a virtual service data unit (SDU) sequence number (SN) is allocated to a service data unit including a second protocol data unit following the first protocol data unit.

In accordance with another aspect of exemplary embodiments of the present invention, there is provided a method for transmitting a signal in a serving base station in a wireless communication system, in which a sequence number of a first protocol data unit being a last protocol data unit received at a mobile station is received from the mobile station, a virtual SDU sequence number is allocated to a service data unit including a second protocol data unit following the first protocol data unit, to be transmitted to the mobile station, and if it is determined that the mobile station requires the handover to the target base station, a target base station is notified of a handover of the mobile station and the virtual SDU sequence number is transmitted to the target base station.

In accordance with a further aspect of exemplary embodiments of the present invention, there is provided a method for transmitting a signal in a target base station in a wireless communication system, in which a handover of an mobile station to the target base station is notified from a serving base station, a virtual SDU sequence number is received from the serving base station, and an service data unit corresponding to the virtual SDU sequence number is transmitted to the mobile station.

In accordance with still another aspect of exemplary embodiments of the present invention, there is provided a wireless communication system having a mobile station, a serving base station that is providing a service to the mobile station, and a target base station to which the mobile station is to perform a handover, in which the mobile station determines a sequence number of a first protocol data unit being a last received protocol data unit, transmits the sequence number of the first protocol data unit to the serving base station, and allocates a virtual SDU sequence number to a service data unit including a second protocol data unit following the first protocol data unit, and the serving base station receives the sequence number of the first protocol data unit from the mobile station, allocates the virtual SDU sequence number to the service data unit including the second protocol data unit following the first protocol data unit, to be transmitted to the mobile station, and if detecting that the mobile station requires the handover to the target base station, notifies the target base station of a handover of the mobile station and transmits the virtual SDU sequence number to the target base station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 3 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention provide a method and system for starting an efficient data transmission and reception during a handover of a mobile station (MS) in a wireless communication system. More particularly, the exemplary embodiments of the present invention provide a method for allocating a virtual service data unit (SDU) sequence number (SN) between a serving base station and a mobile station and starting data transmission and reception between the mobile station and a target base station using the SDU SN.

The virtual SDU SN is a number allocated to an SDU in accordance with the ARQ sequence numbers of protocol data units transmitted and received between the mobile station and the serving base station. The SDU may include at least one PDU.

Now a description will be made of a method for allocating a virtual SDU SN.

A serving base station receives ARQ feedback information including the SN of the last successfully received PDU from an MS. Then the serving base station (BS) allocates virtual SDU SN 0 to an SDU including the PDU and sequentially allocates virtual SDU SNs 1 and 2 to following SDUs, preferably two following SDUs.

The MS transmits the ARQ feedback information including the SN of the last successful PDU to the serving BS. Then the MS allocates virtual SDU SN 0 to the SDU including the PDU. Also, the MS sequentially allocates virtual SDU SNs 1 and 2 to following SDUs, preferably two following SDUs.

In this manner, the MS and the serving BS can allocate the same virtual SDU SNs to the same SDUs.

Figure 1:
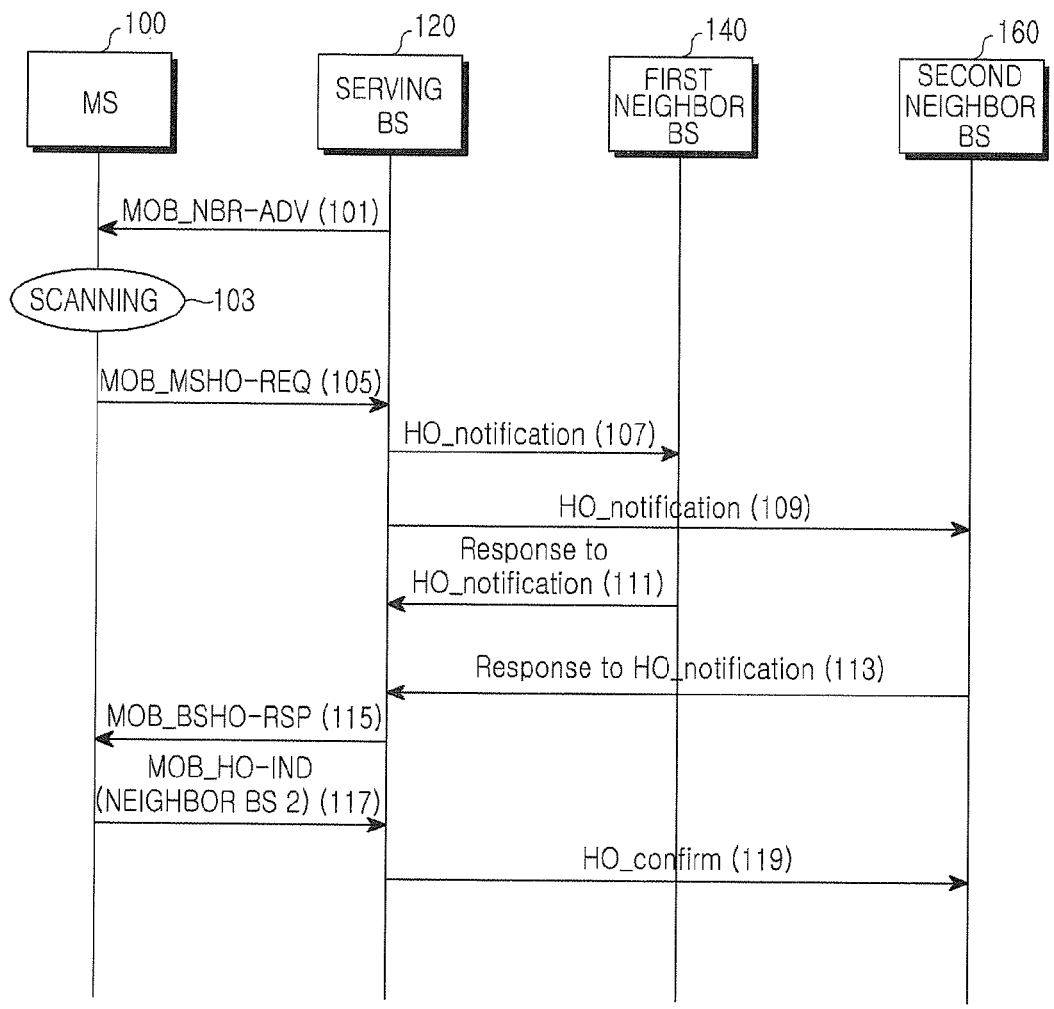
FIG. 1 is a diagram illustrating a signal flow for a handover procedure in a conventional broadband wireless access communication system.
Figure 2:
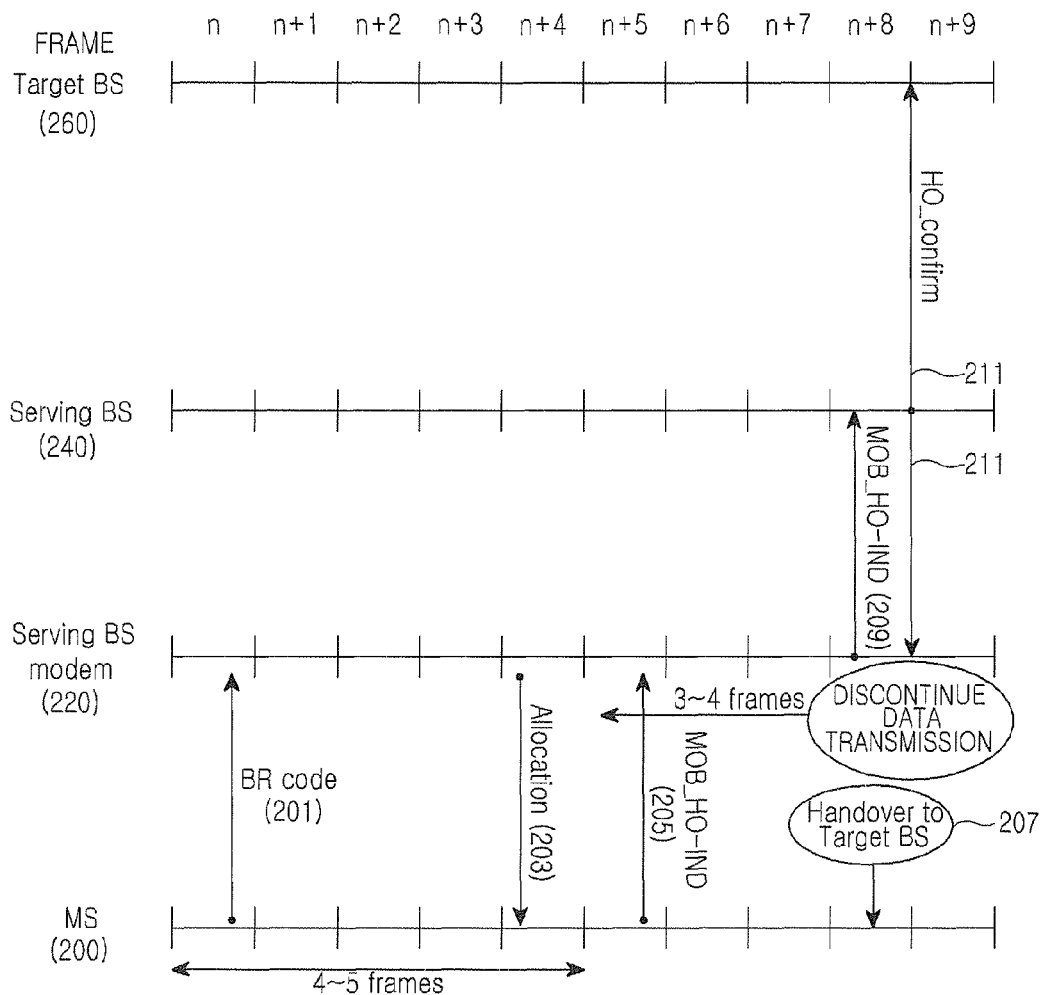
FIG. 2 illustrates a time delay involved in processing a MOB_HO-IND message in the conventional broadband wireless access communication system.
Figure 3:
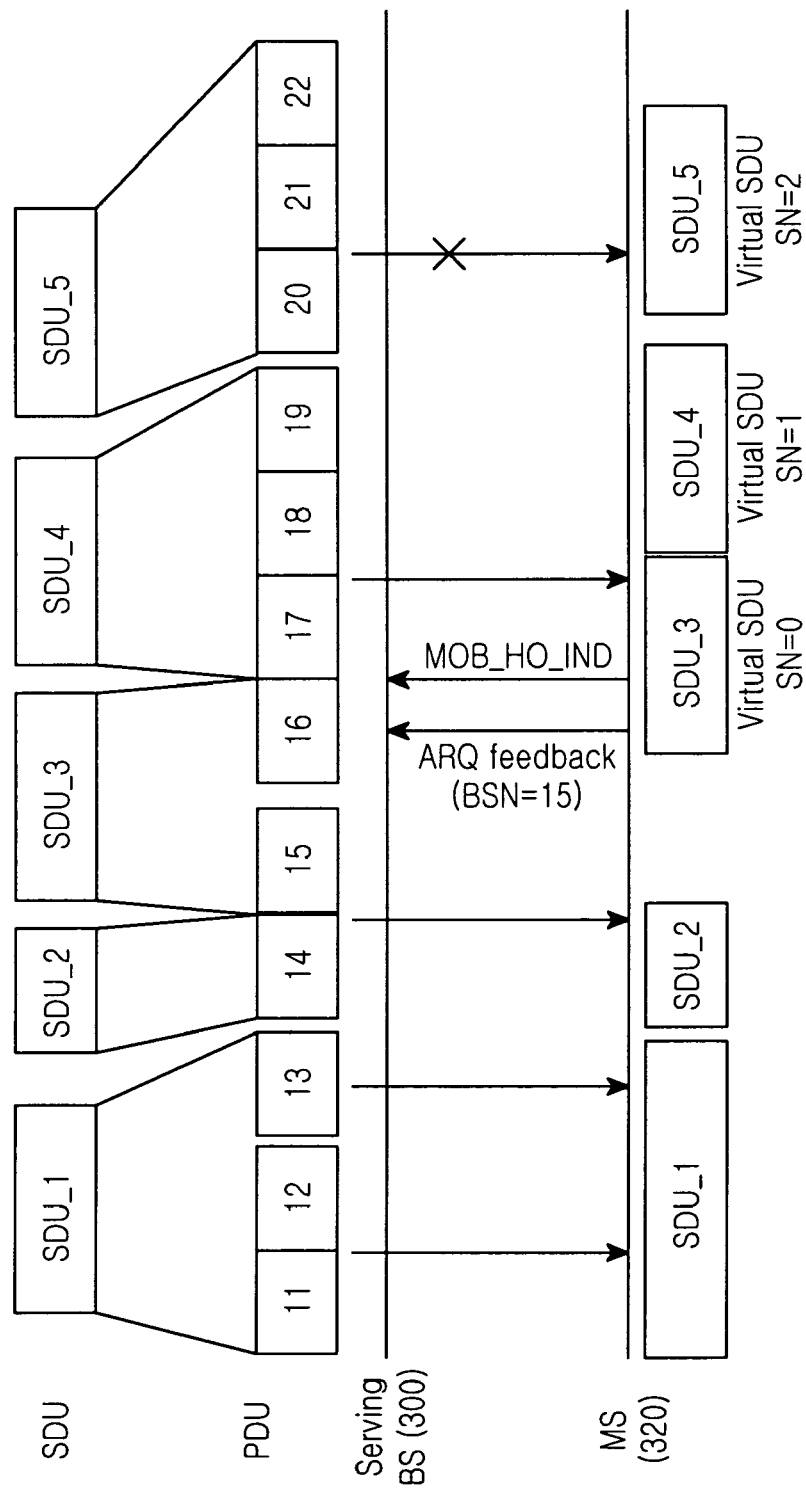
FIG. 3 illustrates a method for allocating virtual SDU sequence numbers according to the present invention.

FIG. 3 illustrates the method for allocating virtual SDU SNs according to the present invention.

Referring to FIG. 3, SDU_1 includes PDUs 11, 12 and 13, SDU_2 includes PDU 14, SDU_3 includes PDUs 15 and 16, SDU_4 includes PDUs 17, 18 and 19, and SDU_5 includes PDUs 20, 21 and 22.

A serving BS 300 receives ARQ feedback information and a MOB_HO-IND message from an MS 320 during sequentially transmitting PDUs 11 to 15 to the MS 320. The ARQ feedback information includes the SN of the last successfully received PDU, PDU SN 15. PDU SN 15 corresponds to SDU_3. Therefore, the serving BS 300 allocates virtual SDU SNs 0, 1 and 2 to SDU_3, SDU_4 and SDU_5, respectively.

The MS 320 transmits the ARQ feedback information including PDU SN 15 and the MOB_HO-IND message to the BS 300 in the state where it has successfully received SDU_1 and SDU_2 and failed to receive PDU 16 in SDU_3. Then the MS 320 receives following PDUs and sequentially allocates virtual SDU SNs 0, 1 and 2 to SDU_3, SDU_4, and SDU_5.

After transmitting the MOB_HO-IND message to the serving BS 300, the MS 320 performs network reentry to a target BS and then transmits a sequence number (SN) report header to the target BS to start data transmission and reception. The SN report header includes an SDU SN. The SDU SN is a virtual SDU SN that the MS 320 and the BS 300 has allocated alike.

For example, in the illustrated case of FIG. 3, when the MS 320 receives SDU_3 and SDU_4 from the serving BS 300 or the target BS after transmitting the ARQ feedback information, it transmits a sequence number (SN) report header including an updated SDU SN, that is, SDU SN 2 to the target BS.

The target BS has already received virtual SDU SN information from the serving BS 300. The target BS is aware that virtual SDU SN 2 included in the SN report header indicates SDU_5. Hence, the target BS transmits PDUs corresponding to SDU_5 to the MS.

Figure 4:
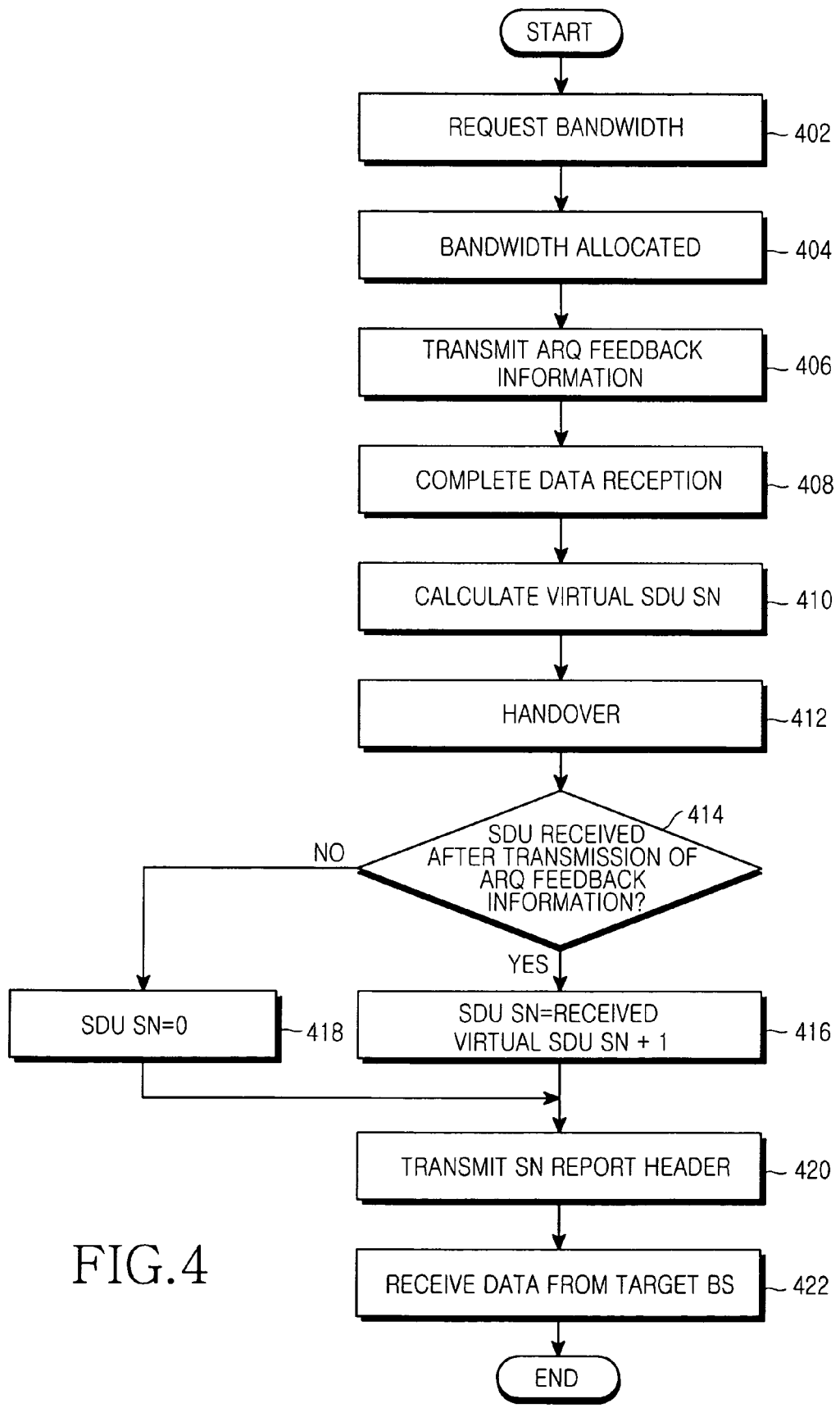
FIG. 4 is a flowchart of an operation for allocating virtual SDU sequence numbers and starting data transmission and reception with a target base station in a mobile station according to an exemplary embodiment of the present invention.

FIG. 4 is a flowchart of an operation for allocating virtual SDU SNs and starting data transmission/reception with a target BS in an MS according to an exemplary embodiment of the present invention.

Referring to FIG. 4, the MS transmits a bandwidth request code to the serving BS in step 402 and is allocated a bandwidth from the serving BS in step 404. The MS can transmit a MOB_HO-IND message or a MOB_HO-IND message and ARQ feedback information to the serving BS using the allocated bandwidth. Thus, the MS transmits the ARQ feedback information in step 406. The ARQ feedback information includes the SN of the last successfully received PDU before transmitting the ARQ feedback information.

In step 408, the MS completes data reception from the serving BS. The MS allocates virtual SDU SNs to SDUs that it has successfully received after transmitting the ARQ feedback information in step 410. That is, the MS can sequentially assign virtual SDU SNs to SDUs that it has successfully received so far or it will receive, starting from virtual SDU SN 0. The MS performs a handover to the target BS in step 412.

In step 414, the MS decides as to whether there is a new received SDU after transmitting the last ARQ feedback information to the serving BS. In the presence of a new received SDU, the MS goes to step 416. In the absence of a new received SDU, the MS goes to step 418.

In step 416, the MS determines the virtual SDU SN of the new successfully received SDU and determines to include (the virtual SDU SN+1) in an SDU SN field of an SN report header. Meanwhile, the MS determines to include virtual SDU SN 0 in the SDU SN field of the SN report header in step 418.

The MS transmits the SN report header including the determined virtual SDU SN to the target BS in step 420 and receives a PDU corresponding to the virtual SDU SN included in the SN report header from the target BS.

Figure 5:
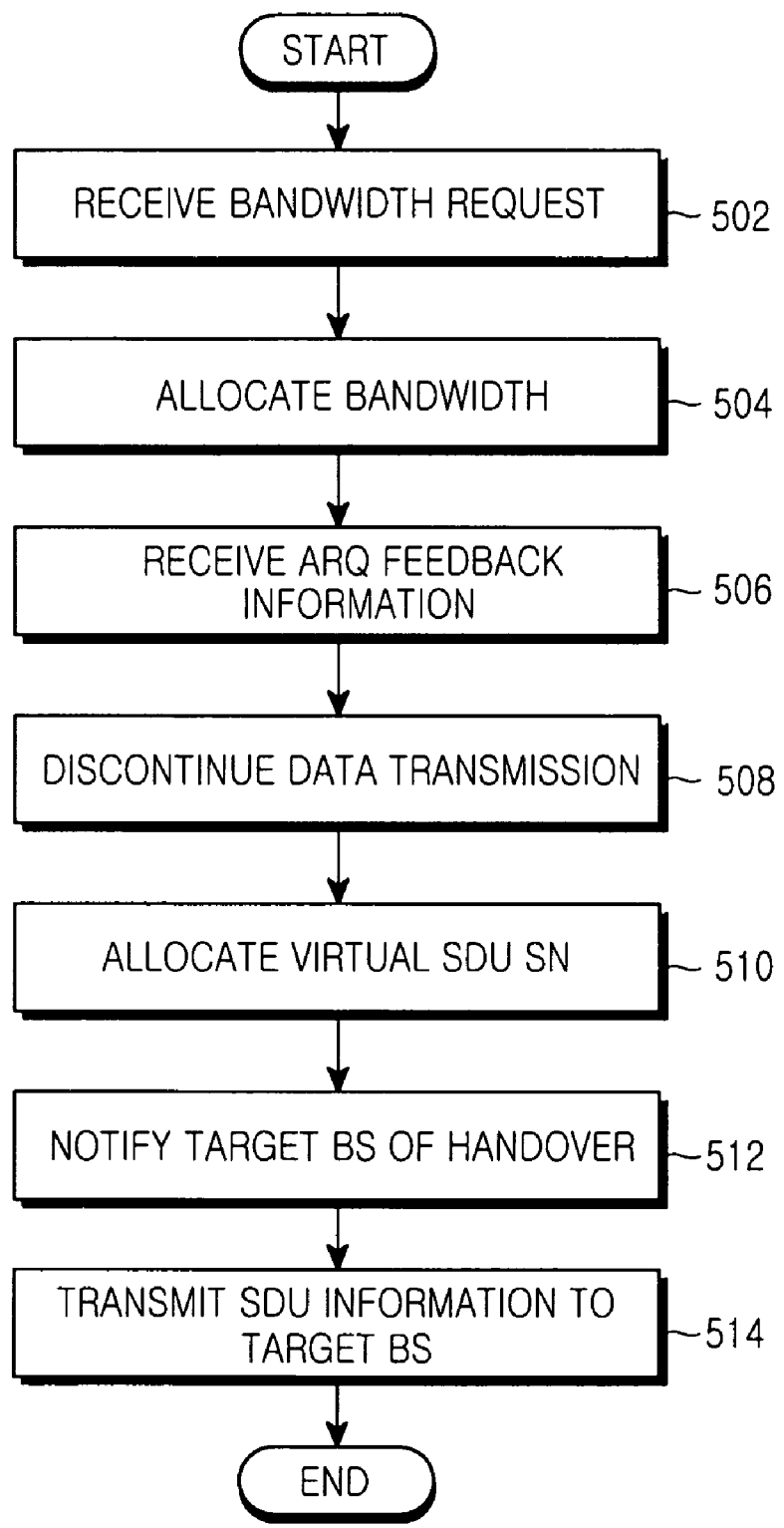
FIG. 5 is a flowchart of an operation for allocating virtual SDU sequence numbers and notifying the target base station of a virtual SDU sequence number in a serving base station according to an exemplary embodiment of the present invention.

FIG. 5 a flowchart of an operation for allocating virtual SDU SNs and notifying the target BS of a virtual SDU SN in the serving BS according to an exemplary embodiment of the present invention.

Referring to FIG. 5, the serving BS receives a bandwidth request code from the MS in step 502 and allocates a bandwidth to the MS so that the MS can transmit a MOB_HO-IND message or both a MOB_HO-IND message and ARQ feedback information in the bandwidth in step 504. In step 506, the serving BS receives the ARQ feedback information from the MS.

In step 508, the serving BS discontinues data transmission to the MS. The serving BS allocates virtual SDU SNs, taking into account an SDU SN included in the ARQ feedback information in step 510 and notifies the target BS of a handover of the MS in step 512. In step 514, the serving BS notifies the target BS of an SDU that the MS is supposed to receive by SDU information. The SDU information is a virtual SDU SN.

Figure 6:
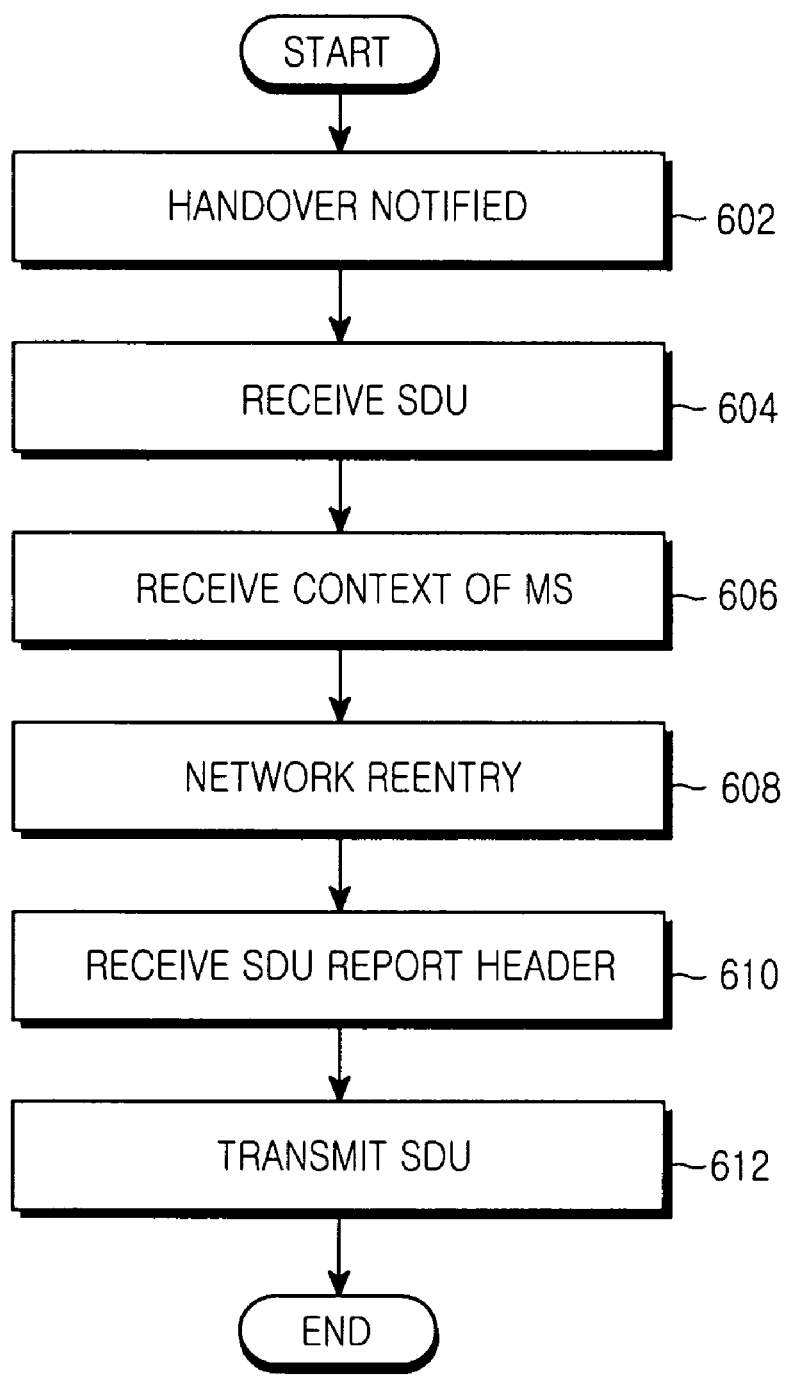
FIG. 6 is a flowchart of an operation for starting data transmission to the mobile station in the target base station according to an exemplary embodiment of the present invention.

FIG. 6 is a flowchart of an operation for starting data transmission to the MS in the target BS according to an exemplary embodiment of the present invention.

Referring to FIG. 6, the target BS is notified of a handover of the MS from the serving BS in step 602 and receives an SDU and SDU information from the serving BS in step 604. The SDU is an SDU that the serving BS was supposed to transmit to the MS and the SDU information is information about the last SDU that the MS has received from the serving BS. The SDU information can be represented as a virtual SDU SN.

The target BS receives information about the MS, authentication information, and information required for providing a service in step 606 and performs network reentry with the MS in step 608. In step 610, the target BS receives an SN report header from the MS. The target MS transmits SDUs following an SDU indicated by virtual SDU SN information included in the SN report header to the MS in step 612. The SDU SN information can be represented as a virtual SDU SN and the target BS transmits the SDU identified by the virtual SDU SN to the MS.

As is apparent from the above description, the present invention advantageously reduces the amount of unnecessary data transmitted among an MS, a serving BS, and a target BS by allocating virtual SDU SNs to SDUs. Furthermore, the data reception delay of the MS is minimized during a handover of the MS.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for receiving a signal by a mobile station in a wireless communication system, the method comprising:
    determining a Sequence Number (SN) of a first Protocol Data Unit (PDU) being a last PDU received from a serving base station;
    transmitting the SN of the first PDU to the serving base station;
    transmitting a handover indication message to the serving base station; and
    allocating a virtual Service Data Unit (SDU) SN to a SDU including the first PDU after transmitting the handover indication message.

2. The method of claim 1, further comprising sequentially allocating a subsequent virtual SDU SN for each subsequent SDU received prior to a handover to a target base station.

3. The method of claim 1, when the mobile station performs a handover from the serving base station to a target base station, further comprising:
    performing network re-entry to the target base station;
    determining whether there is a new SDU received from the serving base station after transmitting the SN of the first PDU to the serving base station;
    transmitting, to a target base station, a virtual SDU SN of the new SDU received from the serving base station, when there is a new SDU received from the serving base station; and
    receiving, from the target base station, a PDU of a SDU corresponding to the next virtual SDU SN following the virtual SDU SN of the new SDU.

4. The method of claim 3, wherein the virtual SDU SN of the new SDU is included in an SDU SN field of a SN report header transmitted to the target base station.

5. The method of claim 3, further comprising transmitting, to the target base station, the virtual SDU SN that was allocated to the SDU including the first PDU when there is not a new SDU received from the serving base station.

6. The method of claim 1, wherein the SDU includes at least one PDU.

7. A method for transmitting a signal by a serving base station in a wireless communication system, the method comprising:
    receiving, from a mobile station, a Sequence Number (SN) of a first Protocol Data Unit (PDU) being a last PDU received at the mobile station;
    receiving, from the mobile station, a handover indication message;
    allocating a virtual Service Data Unit (SDU) SN to each SDU to be transmitted to the mobile station after receiving the handover indication message, starting with an SDU including the first PDU; and
    notifying a target base station of a handover of the mobile station and transmitting the allocated virtual SDU SNs to the target base station.

8. The method of claim 7, wherein a subsequent virtual SDU SN is allocated sequentially for each subsequent SDU corresponding to PDUs transmitted to the mobile station after the SN of the first PDU is received.

9. The method of claim 7, further comprising transmitting to the target base station data that is to be transmitted to the mobile station.

10. The method of claim 7, wherein the each SDU includes at least one PDU.

11. A method for transmitting a signal by a target base station in a wireless communication system, the method comprising:
    receiving, from a serving base station, a notification of a handover of a mobile station to the target base station;
    receiving, from the serving base station, a virtual Service Data Unit (SDU) Sequence Number (SN) for at least one SDU to be transmitted to the mobile station;
    receiving, from the mobile station, a virtual SDU SN of a last SDU received by the mobile station; and
    transmitting, to the mobile station, a Protocol Data Unit (PDU) of a SDU following the last SDU received by the mobile station.

12. The method of claim 11, wherein the virtual SDU SN of the last SDU is included in a SN report header transmitted from the mobile station.

13. The method of claim 12, further comprising receiving, from the serving base station, at least one SDU that the serving base station was supposed to transmit to the mobile station.

14. The method of claim 11, wherein each virtual SDU SN corresponds to a SDU that transmit to the mobile station should have received from the serving base station.

15. The method of claim 11, wherein the at least one SDU includes at least one PDU.

16. A mobile station in a wireless communication system the mobile station comprising:
    a transmitter;
    a receiver; and
    a controller for determining a Sequence Number (SN) of a first Protocol Data Unit (PDU) being a last PDU received by the receiver from a serving base station, controlling the transmitter to transmit the SN of the first PDU to the serving base station, controlling the transmitter to transmit a handover indication message to the serving base station, and allocating a virtual Service Data Unit (SDU) SN to a SDU including the first PDU after transmitting the handover indication message.

17. The mobile station of claim 16, wherein the controller sequentially allocates a subsequent virtual SDU SN for each subsequent SDU received prior to a handover to a target base station.

18. The mobile station of claim 16, wherein the controller, when the mobile station performs a handover from the serving base station to a target base station, performs network re-entry to a target base station, determines whether there is a new SDU received from the serving base station after transmitting the SN of the first PDU to the serving base station, controls the transmitter for transmitting, to the target base station, a virtual SDU SN of the new SDU received from the serving base station, when there is a new SDU received from the serving base station, and wherein the receiver receives, from the target base station, a PDU of a SDU corresponding to the next virtual SDU SN following the virtual SDU SN of the new SDU.

19. The mobile station of claim 16, wherein the virtual SDU SN of the new SDU is included in an SDU SN field of a SN report header transmitted to the target base station.

20. The mobile station of claim 18, wherein the transmitter transmits, to the target base station, the virtual SDU SN that was allocated to the SDU including the first PDU when there is not a new SDU received from the serving base station.

21. The mobile station of claim 16, wherein the SDU includes at least one PDU.

22. A serving base station in a wireless communication system, the serving base station comprising:

a receiver for receiving, from a mobile station, a Sequence Number (SN) of a first Protocol Data Unit (PDU) being a last PDU received at the mobile station, and receiving, from the mobile station, a handover indication message;

a controller for allocating a virtual Service Data Unit (SDU) SN to each SDU to be transmitted to the mobile station after receiving the handover indication message, starting with an SDU including the first PDU, notifying a target base station of a handover of the mobile station; and a transmitter for transmitting the allocated virtual SDU SNs to the target base station.

23. The serving base station of claim 22, wherein a subsequent virtual SDU SN is allocated sequentially for each subsequent SDU corresponding to PDUs transmitted to the mobile station after the SN of the first PDU is received.

24. The serving base station of claim 22, wherein the transmitter transmits to the target base station data that is to be transmitted to the mobile station.

25. The serving base station of claim 22, wherein the each SDU includes at least one PDU.

26. A target base station in a wireless communication system, the target base station comprising:

a receiver for receiving, from a serving base station, a notification of a handover of a mobile station to the target base station, receiving, from the serving base station, a virtual Service Data Unit (SDU) Sequence Number (SN) for at least one SDU to be transmitted to the mobile station, and receiving, from the mobile station, a virtual SDU SN of a last SDU received by the mobile station; and a transmitter for transmitting, to the mobile station, a Protocol Data Unit (PDU) of a SDU following the last SDU received by the mobile station.

27. The target base station of claim 26, wherein the virtual SDU SN of the last SDU is included in a SN report header transmitted from the mobile station.

28. The target base station of claim 26, further comprising receiving, from the serving base station, at least one SDU that the serving base station was supposed to transmit to the mobile station.

29. The target base station of claim 26, wherein each virtual SDU SN corresponds to a SDU that the mobile station should have received from the serving base station.

30. The target base station of claim 26, wherein the at least one SDU includes at least one PDU.

* * * * *